(12) United States Patent
Delaney et al.

(10) Patent No.: US 8,311,800 B1
(45) Date of Patent: Nov. 13, 2012

(54) SYSTEMS AND METHODS FOR DETECTING INCORRECT TRANSLATIONS OF TERMS IN A COMPUTING STRING

(75) Inventors: Andrew Delaney, Lucan (IE); Johann Roturier, Leixlip (IE); Julia Schinharl, Kilbarrack (IE)

(73) Assignee: Symantec Corporation, Mountain View, CA (US)

( * ) Notice: Subject to any disclaimer, the term of this patent is extended or adjusted under 35 U.S.C. 154(b) by 259 days.

(21) Appl. No.: 12/752,880

(22) Filed: Apr. 1, 2010

(51) Int. Cl.
*G06F 17/28* (2006.01)
*G06F 17/20* (2006.01)

(52) U.S. Cl. ............... 704/4; 704/2; 704/7; 704/8

(58) Field of Classification Search ............ 704/2–8
See application file for complete search history.

(56) References Cited

U.S. PATENT DOCUMENTS

| | | | | |
|---|---|---|---|---|
| 6,983,238 B2* | 1/2006 | Gao | .................................. | 704/8 |
| 7,234,093 B2* | 6/2007 | Kadkade | ...................... | 714/741 |
| 8,015,554 B2* | 9/2011 | Varma | ........................... | 717/137 |
| 2002/0040359 A1* | 4/2002 | Green et al. | ...................... | 707/3 |
| 2002/0123880 A1* | 9/2002 | Brown | .............................. | 704/4 |
| 2006/0080083 A1* | 4/2006 | Lin et al. | ........................... | 704/8 |
| 2007/0005337 A1* | 1/2007 | Mount et al. | ...................... | 704/2 |
| 2009/0063126 A1* | 3/2009 | Itagaki et al. | ..................... | 704/2 |
| 2010/0070261 A1* | 3/2010 | Jin et al. | ............................. | 704/2 |

OTHER PUBLICATIONS

Website: http://docs.google.com/gview?a=v&q=cache.vZsOCG0g4SsJ:www.atril.com/docs/ATA-09_07_September_2. pdf+terminology+checking+deja+vu&hl=en&sig=AFQjCNEnVAe13O101fj1jYODek9Tdsk2Bg, *Déjà Vu X Professional: A Review of Version 7.5, Pat II*, by Naomi de Moraes, The ATA Chronicle, Sep. 2007 (6 pgs.).

Website: http://www.acrolinx.com/featurelist_en.html, *acrolinx— Terminology for Information Quality and Linguistic Intelligence*, Apr. 26, 2009 (3 pgs.).

Website: http://www.zaac.de/pdf/LRC%20X1_2006_Zerfass_setup%20for%20term%20term%20check.pdf, *Setup of Term Bases / Term Lists for Terminology Checking*, Angelika Zerfaβ, Holzemer Str. 38, D-53343 Wachtberg, Apr. 2010 (9 pgs.).

Website: http://209.85.229.132/search?q=cache:MBpLavoKAQMJ:www.localisation.ie/resources/conferences/2008/presentations/amaldoado.pps+terminology+consistency+check&cd=1&hlen&ct=cink&client=firefox-a, *Checking Terminology Consistency with Statistical Methods*, Microsoft, Oct. 2, 2008 (24 pgs.).

\* cited by examiner

*Primary Examiner* — Jesse Pullias
(74) *Attorney, Agent, or Firm* — Holland & Hart LLP (57) ABSTRACT

A computer-implemented method for detecting incorrect translations of one or more terms in a computing string is described. A key term in a first language and a translation of the key term in a second language are retrieved. One or more compound terms in the first language that include the key term in the first language are identified. A computing string in the first language and a translation of the computing string in a second language are retrieved. The one or more compound terms in the first language are removed from the computing string in the first language. The key term in the second language is compared with one or more words included in the computing string in the second language. The translation of the one or more terms of the computing string are classified as incorrect based on the comparison.

20 Claims, 11 Drawing Sheets

SYSTEMS AND METHODS FOR DETECTING INCORRECT TRANSLATIONS OF TERMS IN A COMPUTING STRING

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. For example, users demand improvements in the functionality of computing devices. Computer software and other computer products may be developed to improve various functions of computer device. Software and other products, however, may be used by users in various countries. In order to allow users in other countries to use the products, the products may be localized (i.e., translated) from one language to another. Translation procedures, however, may produce inconsistent translations of the same term(s) within a product or across multiple products. As such, benefits may be realized by providing systems and methods for detecting incorrect translations of one or more terms in a computing string that defines computer software or other computer products.

SUMMARY

According to at least one embodiment, a computer-implemented method for detecting incorrect translations of one or more terms in a computing string is described. A key term in a first language and a translation of the key term in a second language are retrieved. One or more compound terms in the first language that include the key term in the first language are identified. A computing string in the first language and a translation of the computing string in a second language are retrieved. The one or more compound terms in the first language are removed from the computing string in the first language. The key term in the first language is compared with one or more terms included in the computing string in the first language. If the key term in the first language exists in the computing string in the first language, the key term in the second language is compared with one or more words included in the computing string in the second language. The translation of the one or more terms of the computing string are classified as incorrect based on the comparison.

In one embodiment, one or more compound terms in the second language that include the key term in the second language are identified. The one or more compound terms in the second language may be removed from the computing string in the second language.

A determination may be made as to whether the key term in the second language matches one or more terms included in the computing string in the second language. A part of speech tag of the key term in the first language may be compared with a part of speech tag of one or more terms included in the computing string in the first language if the key term in the second language does not match one or more terms included in the computing string in the second language. In one configuration, the translation of the one or more terms of the computing string may be classified as incorrect if the part of speech tag of the key term in the first language matches the part of speech tag of the one or more terms included in the computing string in the first language.

In one example, the key term in the first language and the translation of the key term in the second language may be modified. For example, the key term in the first language and the translation of the key term in the second language may be stemmed.

In addition, one or more compound terms in the first language that include the key term in the first language and the one or more compound terms in the second language that include the key term in the second language may be modified. For example, the one or more compound terms in the first language that include the key term in the first language and the one or more compound terms in the second language that include the key term in the second language may be stemmed.

A computer system configured to detect incorrect translations of one or more terms in a computing string is also described. The computer system may include a processor and memory in electronic communication with the processor. The computer system may further include a terminology checking module. The module may be configured to retrieve a key term in a first language and a translation of the key term in a second language, and identify one or more compound terms in the first language that include the key term in the first language. The module may be further configured to retrieve a computing string in the first language and a translation of the computing string in a second language, and remove the one or more compound terms in the first language from the computing string in the first language. In addition, the module may be configured to compare the key term in the second language with one or more terms included in the computing string in the second language, and classify the translation of the one or more terms of the computing string as incorrect based on the comparison.

A computer-program product for detecting incorrect translations of one or more terms in a computing string is also described. The computer-program product may include a computer-readable medium having instructions thereon. The instructions may include code programmed to retrieve a key term in a first language and a translation of the key term in a second language, and code programmed to identify one or more compound terms in the first language that include the key term in the first language. The instructions may further include code programmed to retrieve a computing string in the first language and a translation of the computing string in a second language, and code programmed to remove the one or more compound terms in the first language from the computing string in the first language. In addition, the instructions may further include code programmed to compare the key term in the second language with one or more terms included in the computing string in the second language. Further, the instructions may include code programmed to compare a part of speech tag of the key term in the first language with a part of speech tag of one or more terms included in the computing string in the first language if the key term in the second language does not match one or more terms included in the computing string in the second language. The instructions may also include code programmed to classify the translation of the one or more terms of the computing string as incorrect based on the comparison.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Developers of computer products may create documentation, instructions, and other information associated with the products in a first language, such as English. The other information may include software user input strings, error messages, programming syntax, and the like. The documentation, instructions, and the other information associated with the products may then be translated into languages other than the first language. For example, documentation for a product may first be created in the English language. The documentation may then be translated into another language, such as German, for example. The documentation may be translated into any other language. As a result, end users may use the products regardless of the language they speak or read.

The content included in the documentation, instructions, and other information associated with a product may be extensive. One of the challenges in verifying the translation of a large amount of content within a fixed timeframe is to ensure terminology consistency across the translated content. Terminology consistency is vital so that the users of a product find a concept consistently referred to, both in the product itself, as well as in the related content.

After a translation system has translated the content into a desired language, translators may be given a list of terms that are key terms for the product. The translators may verify that these key terms are translated correctly. Despite terminology guidance given to the translators, inconsistencies within the translated content are a common occurrence. For example, several translators may be used to verify the accuracy of certain key terms within a large amount of translated content. Each of these translators may provide a slightly different translation for a particular term. As a result, the translated content may not be entirely consistent for one or more terms. In addition, inconsistencies of terms between different products may also exist. For example, a first translator verifying the translation of a key term in product A may use a different translation of the key term than a second translator verifying the key term in product B. As a result, the term in product A may be translated different than the same term in product B. Further, legacy or acquired products may introduce obsolete terminology that may cause inconsistencies within the translated content of these products.

Checking and fixing these inconsistencies so as to deliver a consistent translation of the content of a product has traditionally been time-consuming, costly, and unreliable. The volume of the translated content may limit the translator's ability to do spot checks of the key terms in the translated content. In addition, the translation and verification of the translated content have traditionally been, to a large degree, manual. Presently, there is no reliable way to track terminology errors and their related fixes in an automated way. Consistent and clean translated content is essential in facilitating a statistics-based machine translation system in which previously translated content is used to train the system.

The present systems and methods may automatically verify the consistency of the translation of key terms in translated content for a product. The present systems and methods may combine comprehensive linguistic analysis at a term level with a cross-reference of all related compounds in order to generate accuracy in efficient terminology consistency checking.

Figure 1:
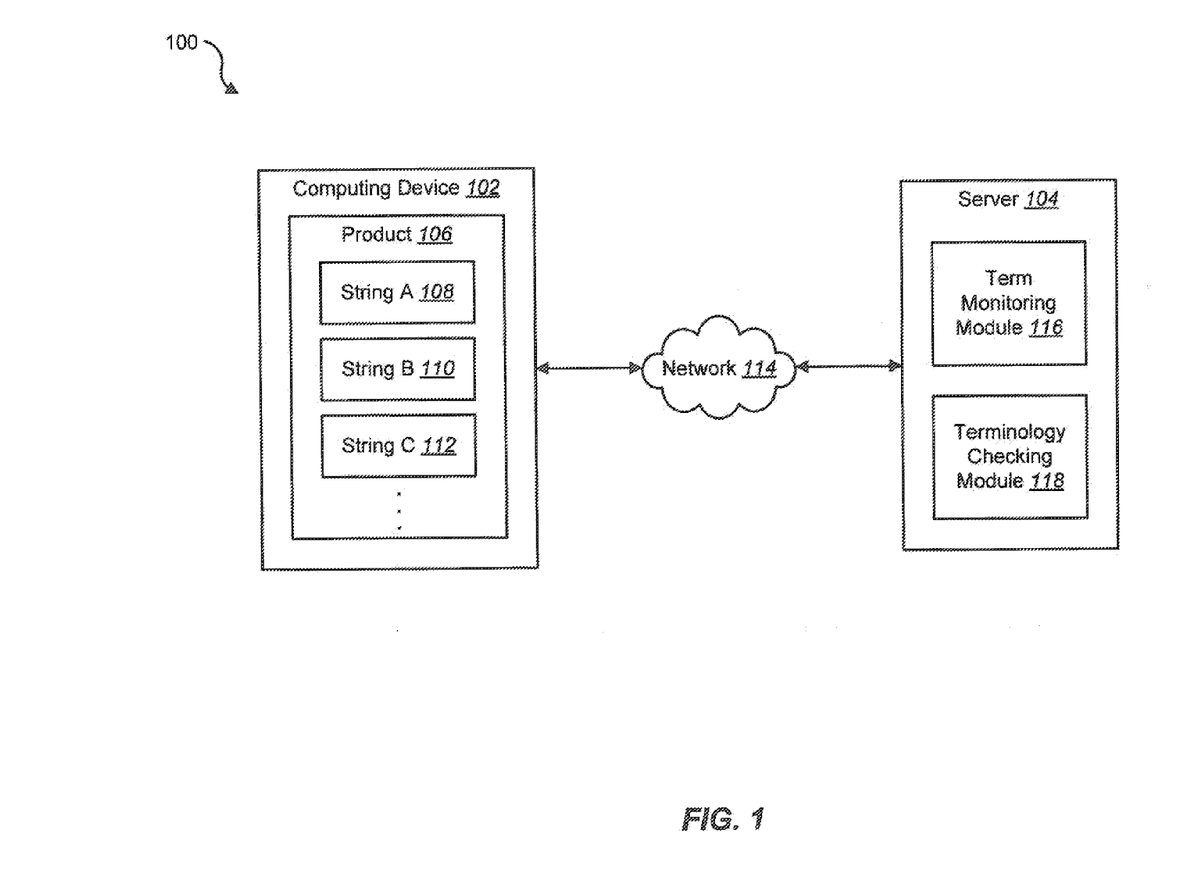
FIG. 1 is a block diagram illustrating one embodiment of an environment in which the present systems and methods may be implemented.

FIG. 1 is a block diagram illustrating one embodiment of an environment in which the present systems and methods may be implemented. In one example, a computing device 102 may communicate with a server 104 across a network connection 114. The computing device 102 may be a personal computer (PC), a laptop, a personal digital assistant (PDA), or any other type of computing device. The network connection 114 may be an intranet connection, an Internet connection, and the like. In another embodiment, the computing device 102 may be connected directly to the server 104 without a network connection 114.

In one embodiment, a product 106 may be installed on the computing device 102. The product 106 may be software or other type of program executed on the computing device 102. In one example, the product 106 may include documentation, instructions, and other information. This content of the product 106 may include multiple strings (e.g., words, phrases, sentences, and the like). For example, the product 106 may include string A 108, string B 110, and string C 112. While only three strings are illustrated, it is to be understood that the content of the product 106 may include more than three strings. In one embodiment, the strings of the product 106 may be written in a first language. For example, the strings 108, 110, 112 may be written in English. A translation system may translate the strings of the product 106 into one or more other languages. The strings 108, 110, 112 may be constructed from one or more terms.

The server 104 may include a term monitoring module 116 and a terminology checking module 118. The monitoring module 116 and the checking module 118 may verify the consistency of certain translated terms in the translated strings. Details regarding the monitoring module 116 and the checking module 118 will be described below.

Figure 2:
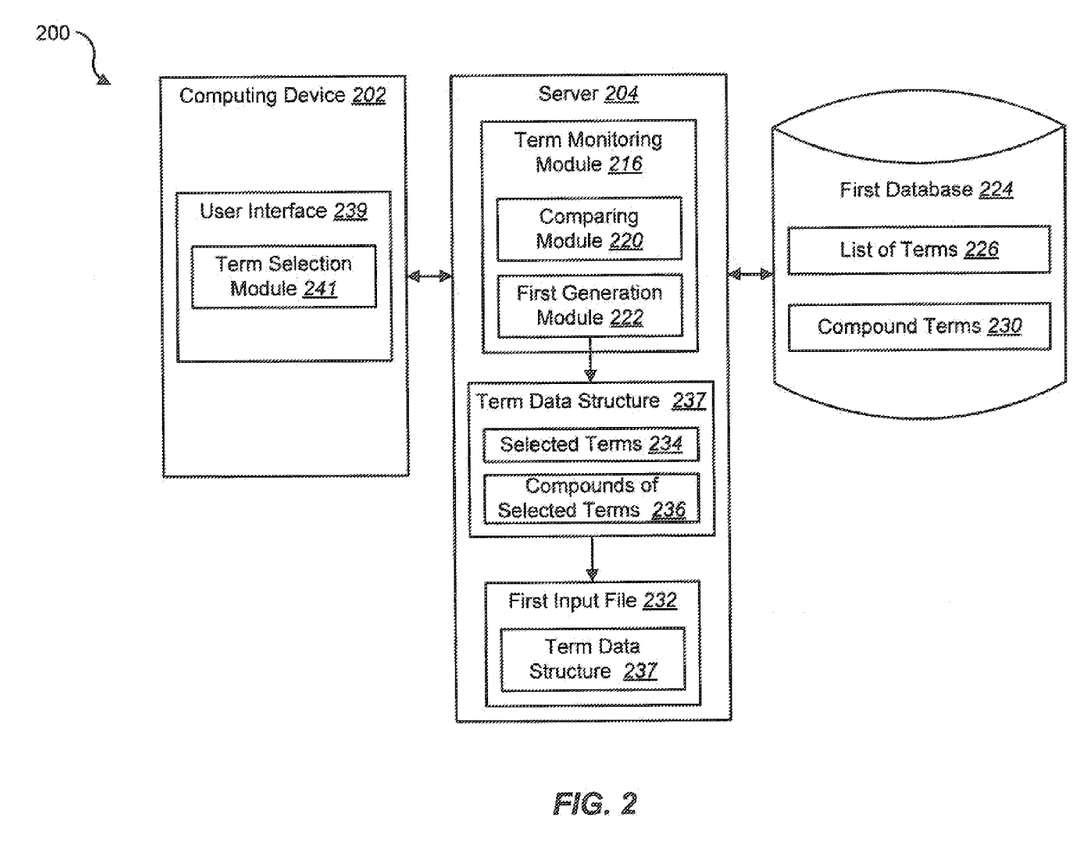
FIG. 2 is a block diagram illustrating one embodiment of a term monitoring module that may implement the present systems and methods.

FIG. 2 is a block diagram illustrating a further embodiment of a term monitoring module 216 that may implement the present systems and methods. As previously explained, a computing device 202 may communicate with a server 204. The computing device 202 may include a user interface 239 that includes a term selection module 241. In one embodiment, a user may select one or more terms to verify within one or more translated strings relating to the product 106.

The server 204 may communicate with a first database 224. In one embodiment, the first database 224 may be a terminology database in accordance with the Term Base eXchange (TBX) standard. In one example, TBX is the open, Extensible Markup Language (XML) based standard for exchanging structured terminological data.

In one configuration, the first database 224 may include a list of terms 226. The list of terms 226 may include terms that developers of the product 106 have determined to be key terms. As an example, the list of terms 226 lists the terms a company has identified as being key terms for the products produced by the company. In other words, the list of terms 226 lists the terms that the company desires to be consistent across the translated content of a single product, or across the translated content of multiple products.

The list of terms 226 may list these key terms in multiple languages. For example, the key terms may be listed in English as well as other languages. The list of terms 226 may also include a part of speech tag for each term. For example, the part of speech tag may identify the term as being a noun, pronoun, adjective, adverb, preposition, conjunction, or an interjection.

In one embodiment, a user may select one or more terms to be checked via the term selection module 241. For example, the list of terms 226 may include, but is not limited to, 6,000 key terms. The user may select, as an example, 50 terms to verify. The terms selected by the user may be provided to the term monitoring module 216. A comparing module 220 may compare the terms submitted by the user with the key terms in the list of terms 226. When the compare module 220 determines that a term submitted by the user matches a key term in the list of terms 226, a first generation module 222 may read the matched term into a term data structure 237. The term data structure 237 includes a list of selected terms 234 that includes a list of key terms submitted by the user to be verified.

In the above example, the list of selected terms 234 may include the 50 key terms in a first language, such as English, a part of speech tag for each of the selected terms, and a translation for the 50 key terms in all other languages for which a translation is available. The list of selected terms 234 may further include a stem or normalization of each of the terms and the translated terms. For example, if one of the key terms selected is "notification", a stem or truncation of this term in English may be "notifica". As previously stated, stems of the translated terms may also be provided in the list of selected terms 234. In one embodiment, the list of terms 226 in the first database 224 may also include a stem or normalization for each of the terms (and their corresponding translations) in the list of terms 226.

In one configuration, the first database 224 may also include a list of compound terms 230. The list of compound terms 230 may be a list that includes some of the key terms in the list of terms 226 combined with one or more other terms. For example, the term "notification" may be a key term and may be included in the list of terms 226. The term "notification" may be also combined with the term "server". As a result, the compound term "notification server" may be included in the list of compound terms 230. In one embodiment, the comparing module 220 may analyze each of the selected terms 234 to determine if the selected terms 234 may be part of a compound term. If the comparing module 220 determines that a selected term is present as a substring in the list of compound terms 230, the compound term may be read into the term data structure 237 in a list of compounds of selected terms 236. In other words, if a user selects the key term "notification" from the term selection module 241, the term "notification" may be read into the list of selected terms 234 and the associated compound "notification server" may be read into the list of compounds of selected terms 236.

When each of the terms selected by the user via the term selection module 241 have been included in the list of selected terms 234 and compounds associated with the selected terms have been included in the list of compounds of selected terms 236, the term data structure 237 may be saved as a first input file 232.

Figure 3:
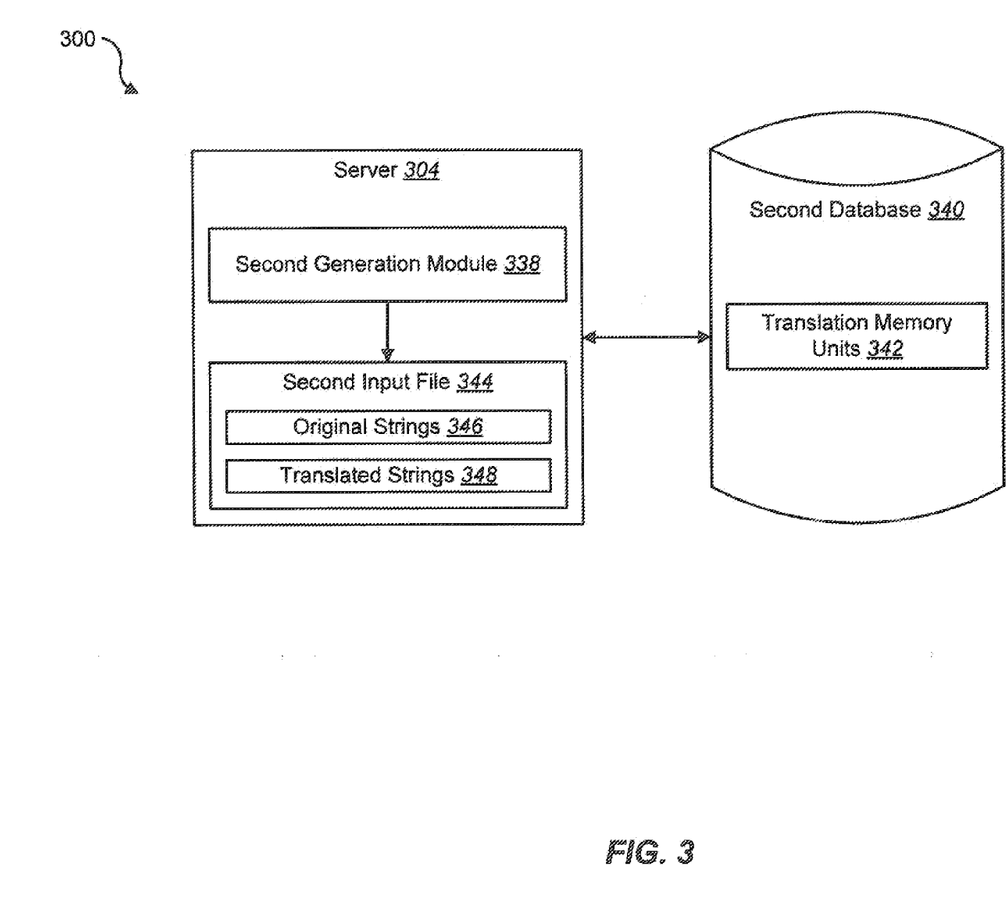
FIG. 3 is a block diagram illustrating one embodiment of a second input file.

FIG. 3 is a block diagram illustrating the generation of a second input file 344. A second database 340 may store translation memory units 342 that include each of the strings of the product 106 in the first language and the corresponding translation of the strings in all of the other languages available. The translation of each string may be executed by a translation system or a translator. The translated strings and the original strings may be stored as the translation memory units 342.

In one embodiment, the second database 340 may be a translation memory (TM) database. A TM database may store sentences or sentence-like units that have been previously translated by a translation system. A server 304 may access the original strings and the translated strings from the second database 340. A second generation module 338 may create a second input file 344 that includes a list of original strings 346 (strings that have not been translated). The second input file 344 may also include a list of translated strings 348 that correspond to the each of the strings listed in the list of original strings 346. In one embodiment, the list of translated strings 348 include translations of the strings in a language selected by the user.

Figure 4:
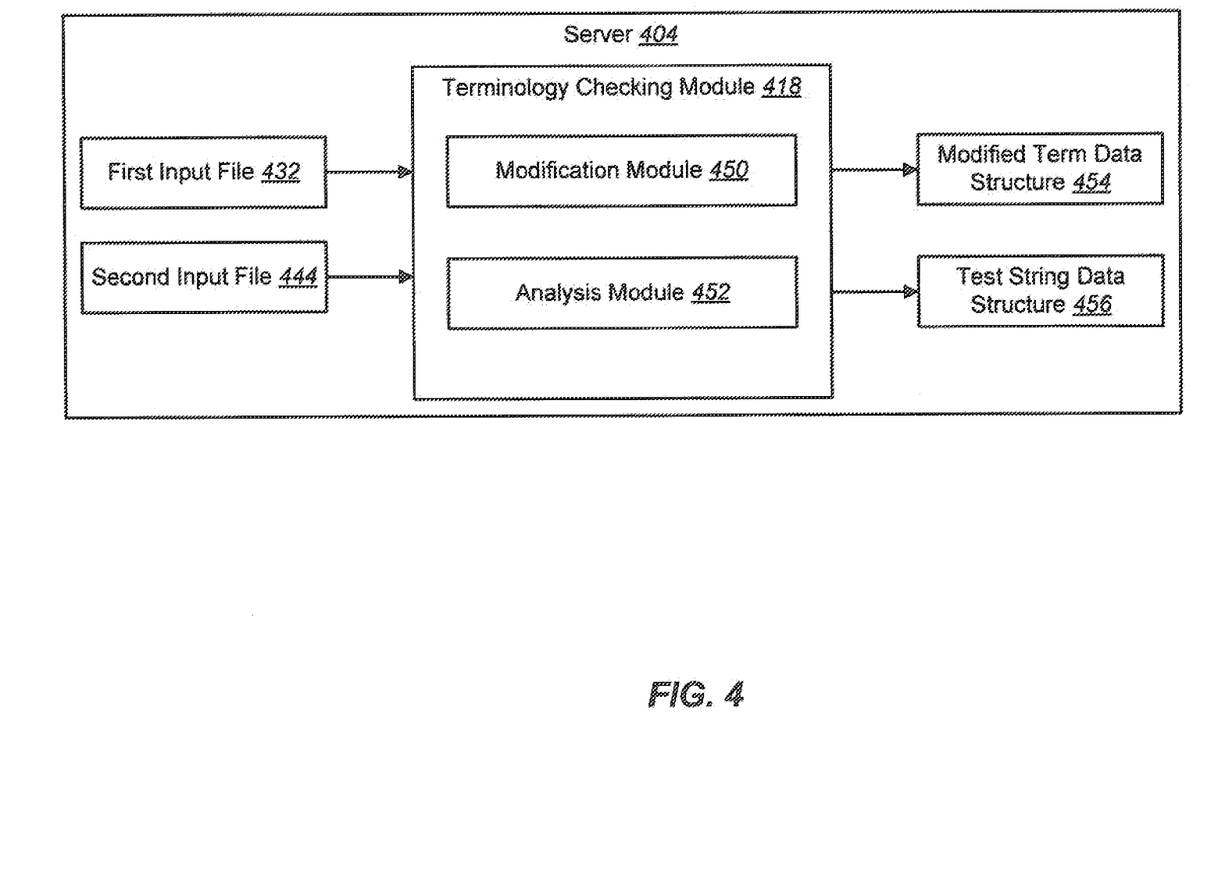
FIG. 4 is a block diagram illustrating one embodiment of a terminology checking module.

FIG. 4 is a block diagram illustrating a further embodiment of a terminology checking module 418. The terminology checking module 418 may be used to implement various features of the present systems and methods.

In one embodiment, a first input file 432 and a second input file 444, as previously described, may be input to the terminology checking module 418. A modification module 450 may modify certain data within the first input file 432. For example, the modification module 450 may read the key terms in a first language, the parts of speech tag for each key term, the stem of each key term in the first language, the translation of each key term in a single selected language (that is different from the first language), and the stem of each translated key term in the single selected language from the first input file 432 into a modified term data structure 454. In addition, the modification module 450 may read the data from the second input file 444 into a test string data structure 456. In one embodiment, the test string data structure 456 may include a list of each original string (i.e., non-translated string) of the product 106. Further, the modification module 450 may stem each word within each original string and each translated string. As a result, the test string data structure 456 may include the original strings of the product 106, the translated strings of the product 106 in the single selected language, the stemmed original strings, and the stemmed translated strings, as well as additional translation information. Detail regarding the modified term data structure 454 and the test string data structure 456 will be provided below.

In one embodiment, the modification module 450 may be further configured to identify modified compound terms within the original modified strings and the translated strings. The modification module 450 may identify the compound terms from the terms listed in the modified term data structure. The module 450 may then remove the identified modified compound terms from the original modified strings and translated modified strings in the test string data structure.

In one configuration, an analysis module 452 may then analyze the data read into the modified term data structure 454 and the test string data structure 456. The analysis module 452 may determine whether a particular key term is translated consistently throughout each of the translated strings of the product 106. As previously explained, the analysis module 452 may not analyze the translation of compound terms because each compound term that includes a key term may have been removed from the test string data structure 456.

Figure 5:
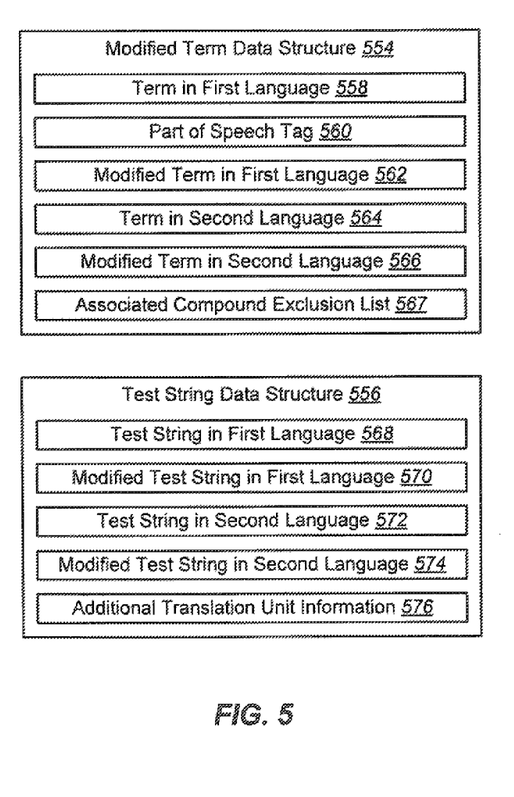
FIG. 5 is a block diagram illustrating a one embodiment of a modified term data structure and a test string data structure.

FIG. 5 is a block diagram illustrating a further embodiment of a modified term data structure 554 and a test string data structure 556. In one embodiment, the modified term data structure 554 may include a term (such as a key term) in a first language 558. For example, the modified term data structure 554 may include a key term in English that has been selected by the user to verify the translation consistency. In addition, the modified term data structure 554 may include a part of speech tag 560 that may indicate the part of speech associated the term in the first language 558. The modified term data structure 554 may also include a modified term in the first language 562. For example, the modified term may be a stem or normalization of the term in the first language 558. Further, the modified term data structure 554 may include the term translated in a second language 564. The second language 564 may be selected by the user. The modified term data structure 554 may also include a modified term translated in the second language 566. As previously explained, the modified term translated in the second language may be a stem or normalization of the translated term. The modified term data structure 554 may also include an exclusion list of associated compound terms 567. The list 567 may be a list of compound terms which may be removed from a test string. As an example, if a test term is "job", the associated compound exclusion list 567 may include compounds such as, but not limited to, job log, delegate job, backup job template, vault job, bundle rollout job, recovery point job, vault job queue, job history, backup job, schedule job, backup-to-disk job, active job, job monitor, job delegation, recovery job, archive job, retention job, job template, virtual job, one-time job, drive-based backup job, conversion job, medium rotation job wizard, medium rotation job, rollout job, and the like.

In one embodiment, the test string data structure 556 may include a test string in a first language 568 (i.e., a non-translated string). The test string data structure 556 may also include a modified test string in the first language 570. The modified test string may include a stem or a normalization of each word forming the test string. The test string data structure 556 may also include the test string translated in a second language 572 and a modified test string translated in the second language 574, which may include a stem or normalization of each word forming the translated test string. The test string data structure 556 may further include additional translation unit information 576 that may be used during the analysis of the translated test strings.

Figure 6:
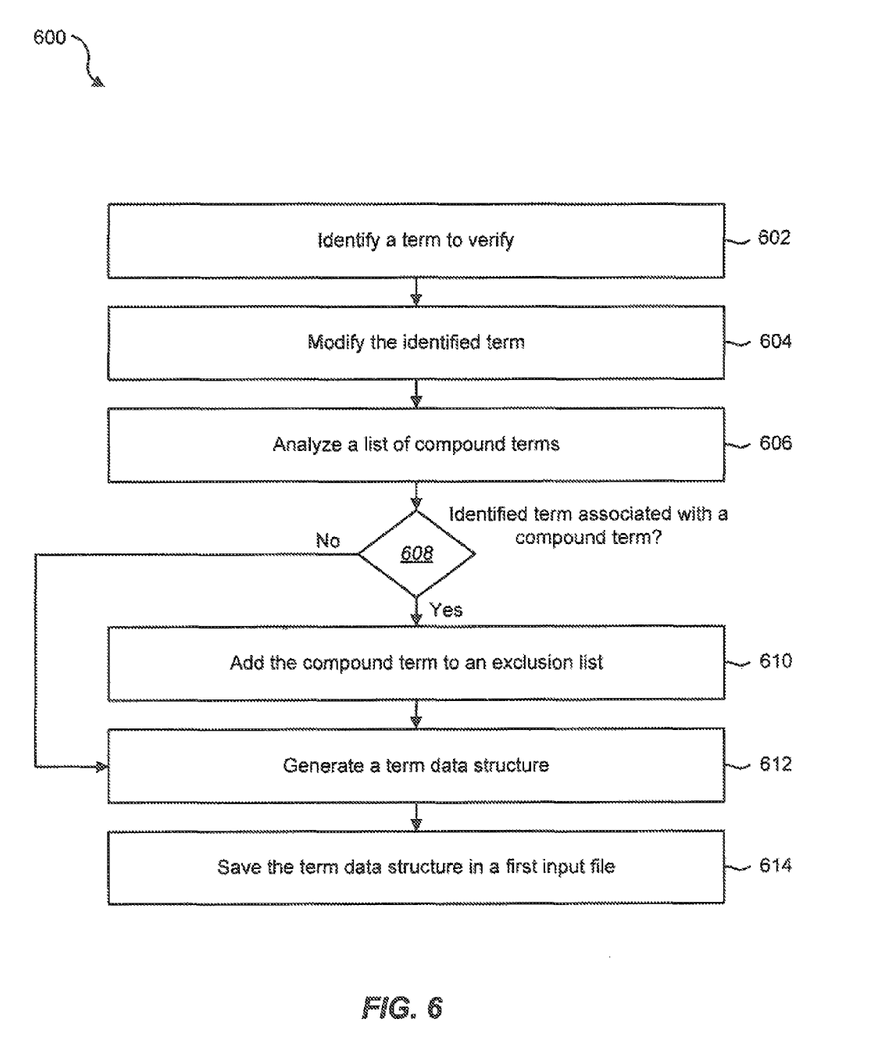
FIG. 6 is a flow diagram illustrating one embodiment of a method for generating a first input file.

FIG. 6 is a flow diagram illustrating on embodiment of a method for generating a first input file. The method 600 may be implemented by the term monitoring module 116.

In one configuration, a term to verify may be identified 602. For example, as previously explained, a user may select a key term in a first language. The key term may be selected in order to verify the translation of this term into another language. The identified term may be modified 604. In one embodiment, the identified term may be stemmed or normalized.

In one embodiment, a list of compound terms may be analyzed 606. A determination 608 may be made as to whether the identified term is part of a compound term. If it is determined 608 that the identified term is part of a compound term, the compound term may be added 610 to an exclusion list, and a term data structure may be generated 612 that includes the compound term. If, however, it is determined 608 that the identified term is not part of a compound term, the term data structure may be generated 612 with only the identified term. As a result, the generated term data structure may include the identified term in the first (or original) language, translations of the identified term in all available languages, the modified term (i.e., stemmed or normalized) in the original language, the modified term in all available languages, a part of speech tag for the term, and any compound terms that the identified term may be associated with. In one embodiment, the term data structure may then be saved in a first input file 614.

Figure 7:
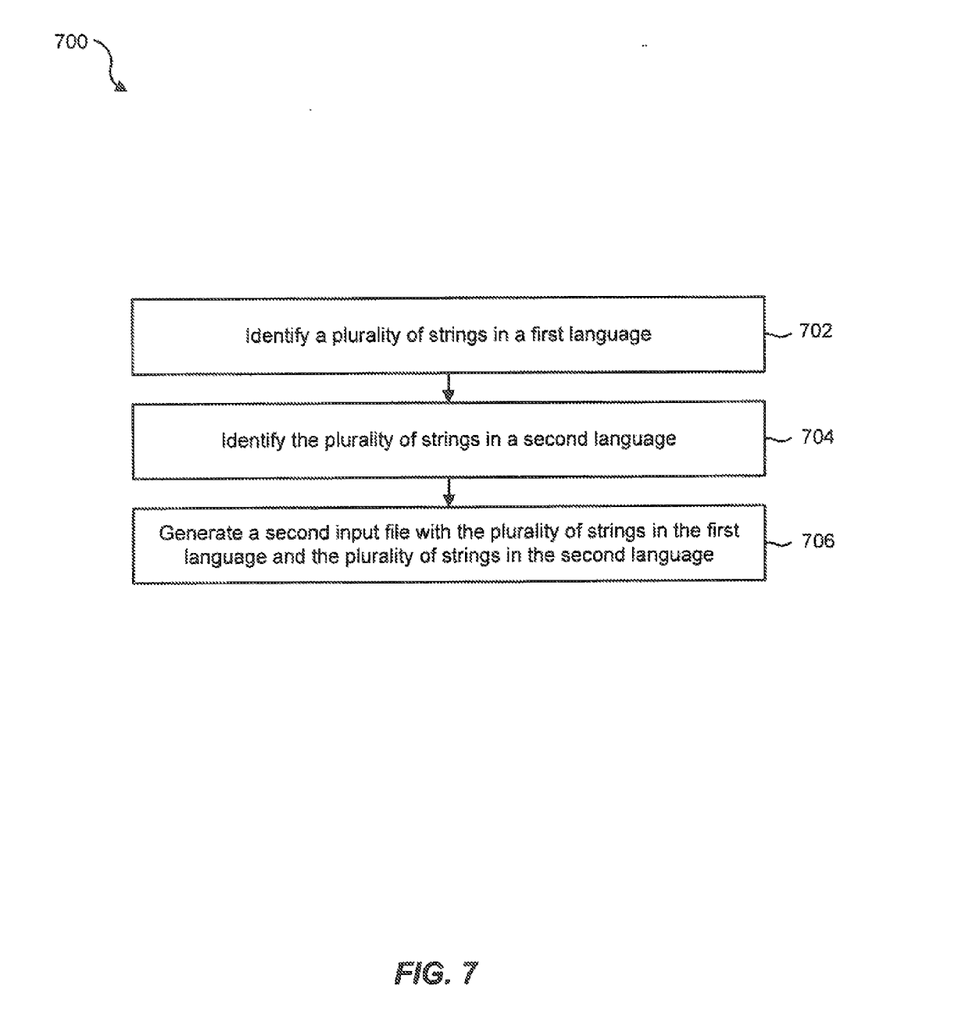
FIG. 7 is a flow diagram illustrating one embodiment of a method for generating a second input file.

FIG. 7 is a flow diagram illustrating one embodiment of a method 700 for generating a second input file. In one embodiment, a plurality of strings in a first language may be identified 702. The strings may be associated with the product 106 previously described. The plurality of strings translated in a second language may also be identified 704. For example, a plurality of strings in English may be identified 702 and the translated strings in a language other than English may also be identified 704. In one configuration, a second input file may be generated 706 that includes the plurality of strings in the first language and the translated plurality of strings in the second language may be generated 706.

Figure 8:
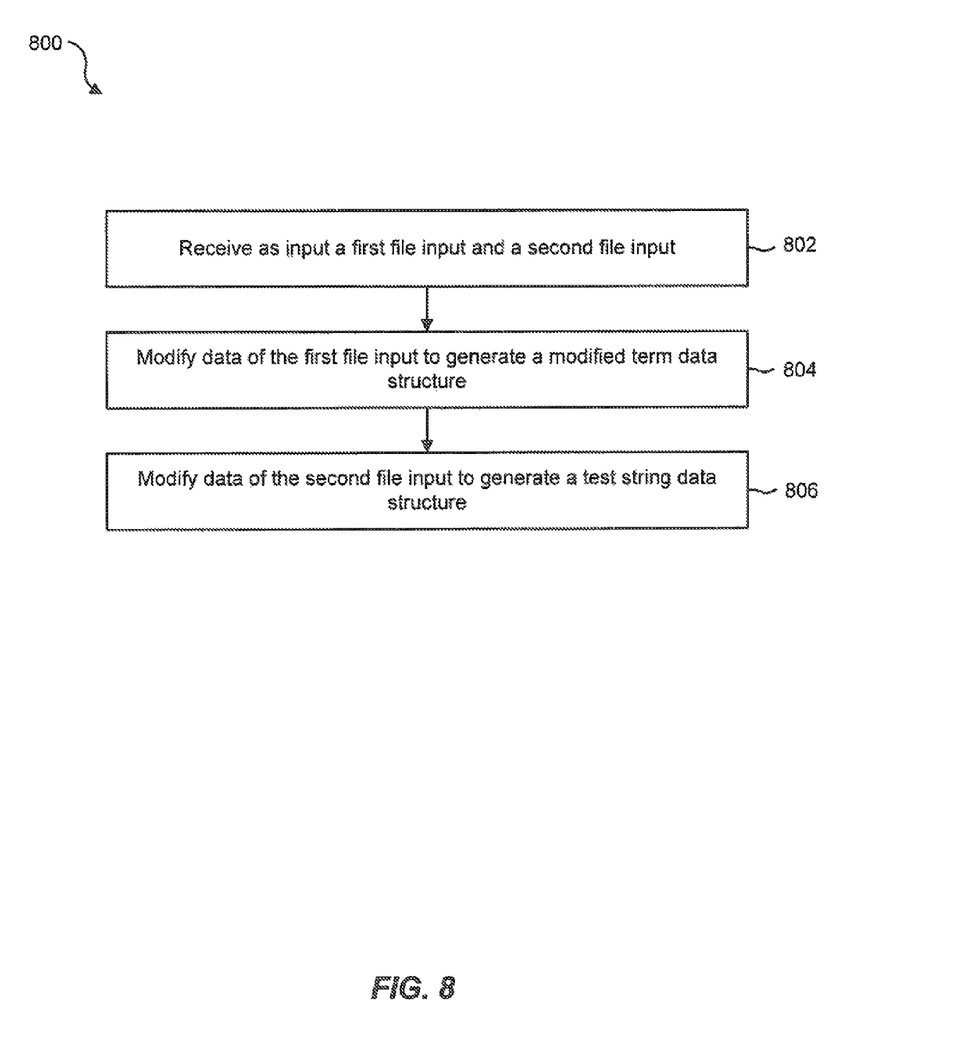
FIG. 8 is a flow diagram illustrating one embodiment of a method for generating data structures with data stored in the first file input and the second file input.

FIG. 8 is a flow diagram illustrating one embodiment of a method 800 for generating data structures from data stored in a first file input and a second file input. The method 800 may be implemented by the terminology checking module 118.

In one embodiment, a first file input and a second file input may be received 802. Data from the first file input may be modified 804 in order to generate a modified term data structure. In one configuration, the list of translations of the key terms in all available languages may be modified so that only the key terms translated in a specific language are included in the modified term data structure. In addition, data from the second file input may be modified 806 to generate a test string data structure. For example, each word in the strings of the product 106 may be stemmed or normalized. In addition, each word in the translated strings of the product 106 may also be stemmed or normalized. The strings and the stemmed strings along with the translated strings and stem of the translated strings may be read into the test string data structure.

Figure 9:
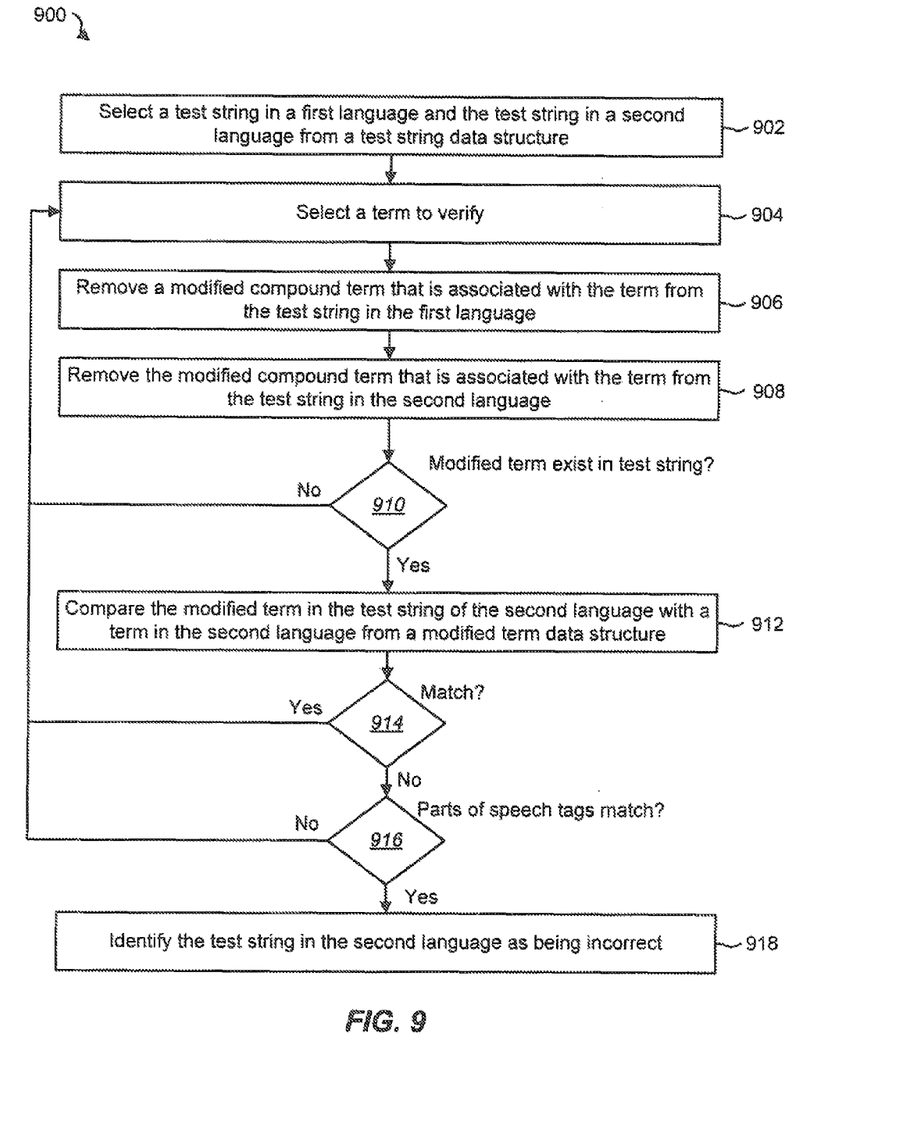
FIG. 9 is a flow diagram illustrating one embodiment of a method for detecting incorrect translations of one or more terms.

FIG. 9 is a flow diagram illustrating one embodiment of a method 900 for verifying the translation of one or more terms. The method 900 may be implemented by the terminology checking module 118. In one embodiment, the method 900 may be implemented by using data from the first input file and the second input file described above.

In one configuration, a test string in the first language and a translation of the test string in the second language may be selected 902 from a test string data structure. The test string data structure may include strings that include the content, instructions, and other information that define a particular product, such as, but not limited to, a software product. A non-translated term to be verified may be selected 904. The term may be in a first language and translated into a second language. A modified non-translated compound term (e.g., a stemmed compound term) that is associated with the selected non-translated term, may be removed 906 from the non-translated test string (i.e., the test string in the first language).

In one embodiment, a modified translated compound term that is associated with a translation of the selected term may be removed 908 from the translated test string (i.e., the test string in the second language). A determination 910 may be made as to whether a modification of the selected non-translated term (i.e., a stem of the selected term) exists in the non-translated test string. If it is determined 910 that a modification of the selected non-translated term does not exist in the non-translated test string, the method 900 may return to select 904 an additional non-translated term from the test string. If, however, it is determined 910 that a modification of the selected non-translated term does exist in the non-translated test string, the modified translated term in the translated test string may be compared 912 with a translation of the term from a modified term data structure.

A determination 914 may be made as to whether the modified translated term in the translated test string matches with the translation of the term. If it is determined 914 that there is a match, the method 900 may return to select 904 an additional non-translated term from the test string. If, however, it is determined 914 that a match does not exist, a determination 916 may be made as to whether a part of speech tag for the modified original term in the original string matches a part of speech tag for the modified original term in the modified term data structure. If the parts of speech tags do not match, the method 900 may return to select 904 an additional non-translated term from the test string. If, however, it is determined 916 that the parts of speech tags do match, the translated test string may be identified 920 as being translated incorrectly.

Figure 10:
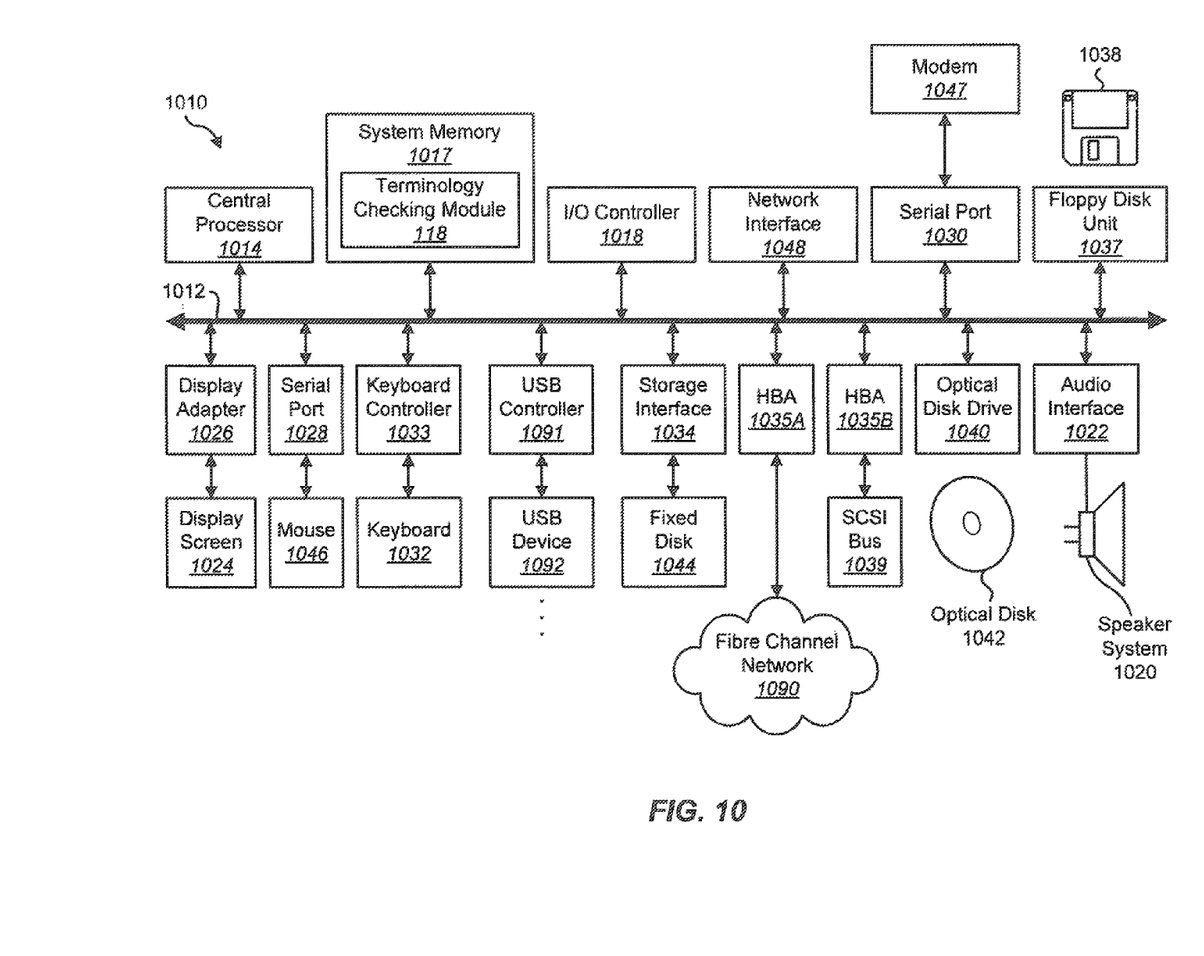
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1090), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the terminology checking module 118 to implement the present systems and methods may be stored within the system memory 1017. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
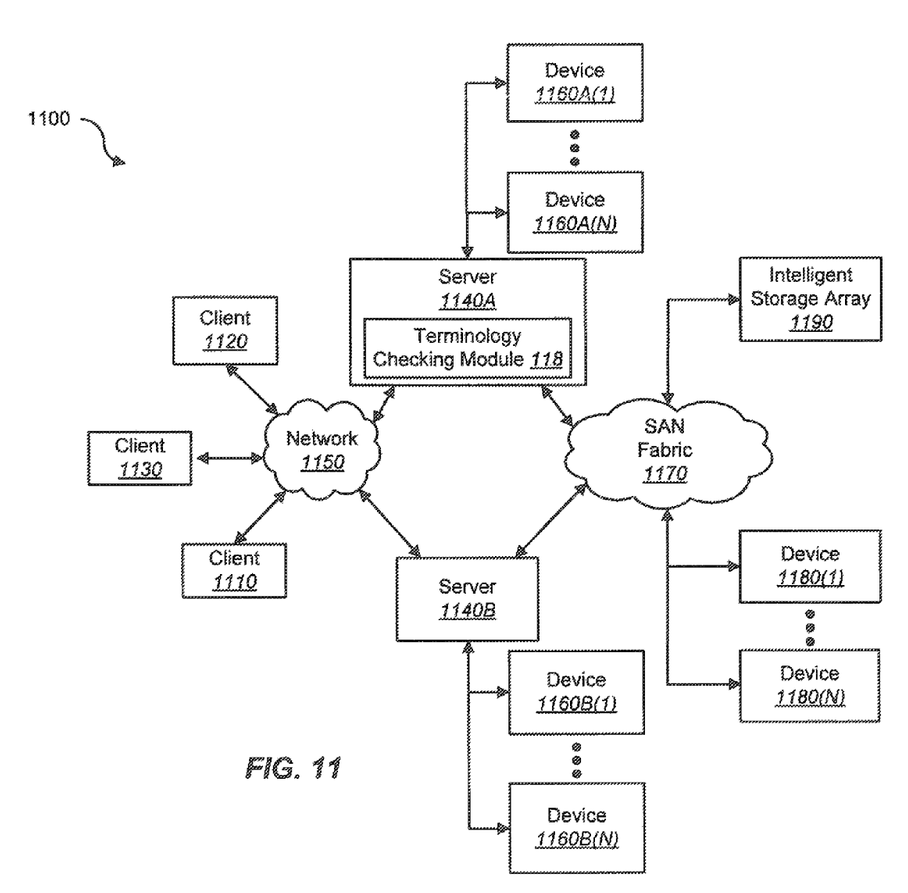
FIG. 11 is a block diagram depicting a network architecture in which client systems, as well as storage servers (any of which can be implemented using computer system), are coupled to a network.

FIG. 11 is a block diagram depicting a network architecture 1100 in which client systems 1110, 1120 and 1130, as well as storage servers 1140A and 1140B (any of which can be implemented using computer system 1010), are coupled to a network 1150. In one embodiment, the terminology checking module 118 may be located within a server 1140A, 1140B to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting incorrect translations of one or more terms in a computing string, comprising:
   retrieving, by a processor, a key term in a first language and a translation of the key term in a second language;
   identifying, by the processor, one or more compound terms in the first language that include the key term in the first language;
   retrieving, by the processor, a computing string in the first language and a translation of the computing string in the second language;
   removing, by the processor, the one or more compound terms in the first language from the computing string in the first language to obtain a first test string that lacks compound terms with the key term;
   comparing, by the processor, the translation of the key term in the second language with one or more terms included in the translation of the computing string in the second language; and
   classifying, by the processor, the translation of the one or more terms of the translation of the computing string in the second language based on the comparison.

2. The method of claim 1, further comprising identifying compound terms in the second language that include the translation of the key term in the second language.

3. The method of claim 2, further comprising removing the one or more compound terms in the second language from the translation of the computing string in the second language.

4. The method of claim 1, further comprising determining whether the translation of the key term in the second language matches one or more terms included in the translation of the computing string in the second language.

5. The method of claim 4, further comprising comparing a part of speech tag of the key term in the first language with a part of speech tag of one or more terms included in the translation of the computing string in the second language if the translation of the key term in the second language does not match one or more terms included in the translation of the computing string in the second language.

6. The method of claim 5, further comprising classifying the translation of the one or more terms of the translation of the computing string in the second language as incorrect if the part of speech tag of the key term in the first language matches the part of speech tag of the one or more terms included in the translation of the computing string in the second language.

7. The method of claim 1, further comprising modifying the key term in the first language and the translation of the key term in the second language.

8. The method of claim 7, further comprising stemming the key term in the first language and the translation of the key term in the second language.

9. The method of claim 1, further comprising modifying one or more compound terms in the first language that include the key term in the first language and the one or more compound terms in the second language.

10. The method of claim 9, further comprising stemming the one or more compound terms in the first language that include the key term in the first language and the one or more compound terms in the second language.

11. A computer system configured to detect incorrect translations of one or more terms in a computing string, comprising:
a processor;
memory in electronic communication with the processor, the memory storing executable instructions that, when executed by the processor, cause the processor to:
retrieve a key term in a first language and a translation of the key term in a second language;
identify one or more compound terms in the first language that include the key term in the first language;
retrieve a computing string in the first language and a translation of the computing string in the second language;
remove the one or more compound terms in the first language from the computing string in the first language to obtain a first test string that lacks compound terms with the key term;
compare the translation of the key term in the second language with one or more terms included in the translation of the computing string in the second language; and
classify the translation of the one or more terms of the translation of the computing string in the second language based on the comparison.

12. The computer system of claim 11, wherein the processor is further configured to identify one or more compound terms in the second language that include the translation of the key term in the second language.

13. The computer system of claim 12, wherein the processor is further configured to remove the one or more compound terms in the second language from the translation of the computing string in the second language.

14. The computer system of claim 11, wherein the processor is further configured to determine whether the translation of the key term in the second language matches one or more terms included in the translation of the computing string in the second language.

15. The computer system of claim 14, wherein the processor is further configured to compare a part of speech tag of the key term in the first language with a part of speech tag of one or more terms included in the translation of the computing string in the second language if the translation of the key term in the second language does not match one or more terms included in the translation of the computing string in the second language.

16. The computer system of claim 15, wherein the processor is further configured to classify the translation of the one or more terms of the translation of the computing string in the second language as incorrect if the part of speech tag of the key term in the first language matches the part of speech tag of the one or more terms included in the translation of the computing string in the second language.

17. The computer system of claim 11, wherein the processor is further configured to modify the key term in the first language and the translation of the key term in the second language.

18. The computer system of claim 17, wherein the processor is further configured to stem the key term in the first language and the translation of the key term in the second language.

19. The computer system of claim 11, wherein the processor is further configured to modify one or more compound terms in the first language that include the key term in the first language and the one or more compound terms in the second language.

20. A computer-program product for comprising a non-transitory computer-readable medium having instructions thereon, the instructions, when executed by a processor, cause the processor to:
retrieve a key term in a first language and a translation of the key term in a second language;
identify one or more compound terms in the first language that include the key term in the first language;
retrieve a computing string in the first language and a translation of the computing string in the second language;
remove the one or more compound terms in the first language from the computing string in the first language to obtain a first test string that lacks compound terms with the key term;
compare the translation of the key term in the second language with one or more terms included in the translation of the computing string in the second language;
compare a part of speech tag of the key term in the first language with a part of speech tag of one or more terms included in the translation of the computing string in the second language if the key term in the second language does not match one or more terms included in the computing string in the second language; and
classify the translation of the one or more terms of the translation of the computing string in the second language based on the comparison.

* * * * *